(12) United States Patent
Rainey, III et al.

(10) Patent No.: US 8,458,435 B1
(45) Date of Patent: Jun. 4, 2013

(54) SEQUENTIAL WRITE THREAD DETECTION

(75) Inventors: Charles P. Rainey, III, Laguna Niguel, CA (US); Dominic S. Suryabudi, Irvine, CA (US); Ho-Fan Kang, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 353 days.

(21) Appl. No.: 12/973,085

(22) Filed: Dec. 20, 2010

(51) Int. Cl.
*G06F 12/00* (2006.01)
(52) U.S. Cl.
USPC ............ 711/203; 711/103; 711/114; 711/202
(58) Field of Classification Search
USPC .................................. 711/103, 114, 202, 203
See application file for complete search history.

(56) References Cited

U.S. PATENT DOCUMENTS

| | | | |
|---|---|---|---|
| 7,509,471 B2 | 3/2009 | Gorobets | |
| 7,631,162 B2 | 12/2009 | Gorobets | |
| 8,339,636 B2 * | 12/2012 | Yamada et al. | 358/1.15 |
| 2005/0144360 A1 | 6/2005 | Bennett et al. | |
| 2005/0166206 A1 * | 7/2005 | Parson | 718/104 |
| 2008/0256287 A1 | 10/2008 | Lee et al. | |
| 2008/0307192 A1 | 12/2008 | Sinclair et al. | |
| 2009/0019218 A1 | 1/2009 | Sinclair et al. | |
| 2009/0150599 A1 | 6/2009 | Bennett | |
| 2009/0271562 A1 | 10/2009 | Sinclair | |
| 2010/0095055 A1 | 4/2010 | Gorobets | |
| 2010/0095084 A1 | 4/2010 | Manning | |

* cited by examiner

*Primary Examiner* — John Lane

(57) ABSTRACT

Embodiments of the invention are directed to systems and methods for detecting sequential write threads in non-volatile storage media. The embodiments described herein detect write commands directed to a range of logical addresses corresponding to a write thread. Upon detection of a write command directed to a write thread, the write command is assigned a physical write address associated with the write thread. Identification of write threads can be implemented with a hardware component which performs comparison operations between the write command address range and the write thread address range.

18 Claims, 6 Drawing Sheets

SEQUENTIAL WRITE THREAD DETECTION

BACKGROUND

Solid-state storage systems receive write commands which are frequently directed to groups of similar logical addresses. For example, audio-visual applications from host devices often store long data streams to sequential logical addresses, referred to below as threads. A host device may have multiple simultaneous threads. When a host device uses non-volatile storage (e.g., a NAND-based storage system), it may be advantageous to store these threads in dedicated localities. Physically co-locating logical addresses reduces garbage collection overhead because entire blocks are more likely to be invalidated when a thread starting at a particular logical address is overwritten. Reducing garbage collection write activity increases system performance and increases drive life.

BRIEF DESCRIPTION OF THE DRAWINGS

Systems and methods which embody the various features of the invention will now be described with reference to the following drawings, in which.

DETAILED DESCRIPTION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

System Overview

Embodiments of the invention are directed to systems and methods of detecting sequential write threads in a solid-state storage system. The embodiments described herein enable detection of write commands which correspond to write threads by using write thread data maintained by a solid-state storage system. In one embodiment, the solid-state storage system maintains data indicative of ranges associated with a plurality of write threads. In further embodiments, the solid-state storage system identifies a write thread to which an incoming write command belongs based on comparing the address ranges associated with the plurality of write threads with the address associated with the write command and updates the write thread data as a result of the identification. A physical address associated with the matching write thread is also assigned to the write command. In some embodiments, data identifying a write thread is replaced with data from an incoming write command when no write thread is identified as a match, signifying that the incoming write command is considered as the first command of a new write thread.

A non-volatile solid-state storage system may receive write commands from a host or a plurality of hosts. In a single-host environment, the host may generate write commands from a variety of write threads. In one embodiment, it may be helpful for the solid-state storage system to intelligently identify write commands which originate from these various sources (e.g., different applications executing on a host). Identifying distinct sources for write commands allows the storage system to determine improved methods of storing the data associated with the write commands for the sources. For example, write commands from a particular source may be stored in a particular area in memory or in particular locations to improve write, read, or erase performance. Such identification can provide localized fragmentation by storing writes from a particular source in a localized area of storage. Though the example embodiments for associating write commands with a write thread described herein are directed to a solid-state storage system, these embodiments may be applicable to any non-volatile storage media.

Figure 1A:
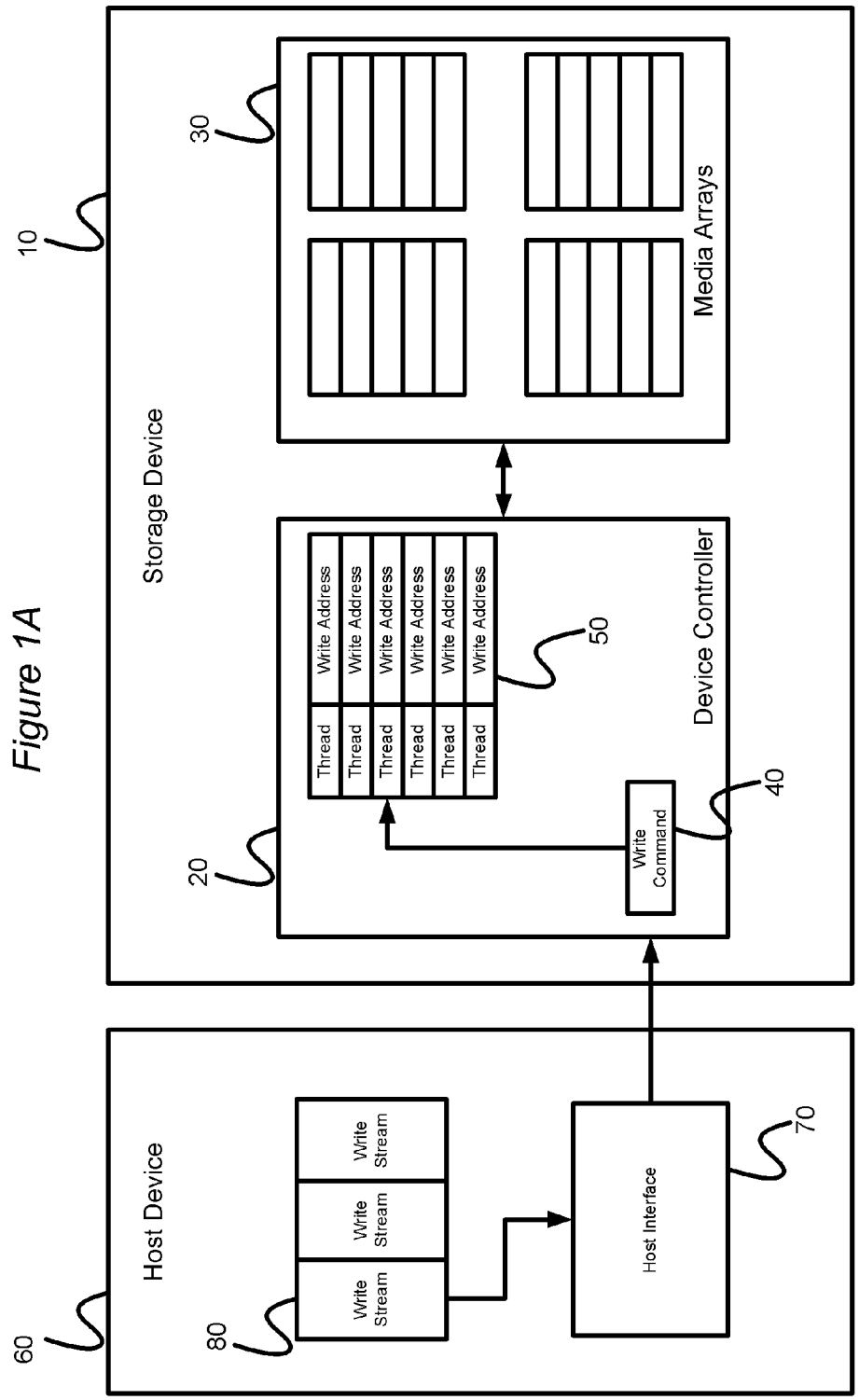
FIG. 1A is a block diagram showing an overview of a non-volatile solid-state storage system according to an embodiment.

Referring to FIG. 1A, an overview of a solid-state storage system according to one embodiment is provided. Storage device 10 includes a controller 20 and solid-state media arrays 30. In one embodiment, the controller 20 maintains write thread data 50, which includes information related to a plurality of write threads. For each write thread, the controller can also maintain an associated physical write address for the write thread.

In one embodiment, the device controller is in communication with a host device 60. In the embodiment depicted in FIG. 1A, the host device 60 has a plurality of write streams 80. The write streams 80 can submit write commands to the host interface 70 for execution on the storage device 10. A write stream 80 can be any source of write commands from the host device which address write commands in a related range of logical addresses. This may comprise writing to sequential logical addresses or writing to a defined static range of addresses or any other related grouping.

In one embodiment, the storage device controller 20 receives commands from the host interface 70. As received by the storage device controller 20, the received commands do not indicate any relationship to a write stream on the host. When the device controller 20 identifies that a write command 40 has been received, the controller compares the write command to the write thread data 50 to determine if the write command corresponds to a write thread referenced by the write thread data. If the write command corresponds to a write thread, the physical write address associated with the corresponding write thread in write thread data 50 is designated as the physical address for the incoming write command. By designating physical addresses associated with particular write threads, the controller can advantageously assign adjacent physical address locations for associated write commands. For example, data written to the media arrays based on write commands associated with a thread may be more likely to be erased at the same time. As such, associated write commands can be addressed to a common area of physical memory, which provides advantages for a simultaneous erase. This may be achieved by associating each write thread with an open "superblock" of memory, with references a logical collection of related physical addresses.

Figure 1B:
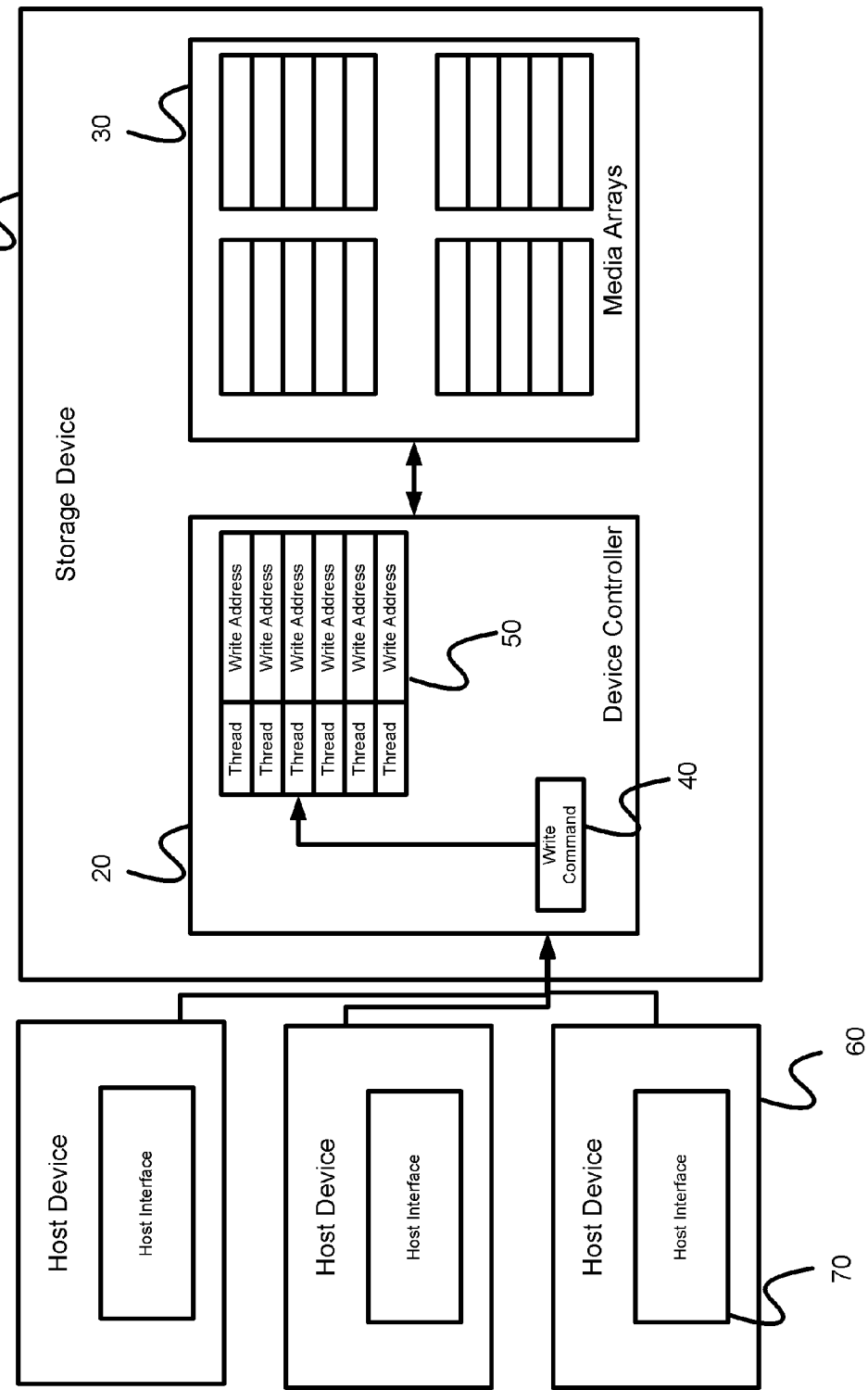
FIG. 1B is a block diagram showing an overview of a non-volatile solid-state storage system according to an embodiment.

Referring to FIG. 1B, a solid-state storage device 10 is shown. In this embodiment, the device controller 20 may receive commands from a plurality of host devices 60. In this case, the write threads may correspond to commands received from each host device. It is also possible that each host device contains multiple write streams as shown in FIG. 1A. In one embodiment, the thread identification process for write commands arriving from multiple host devices is the same as that depicted in FIG. 1A.

Thread Identification

Figure 2:
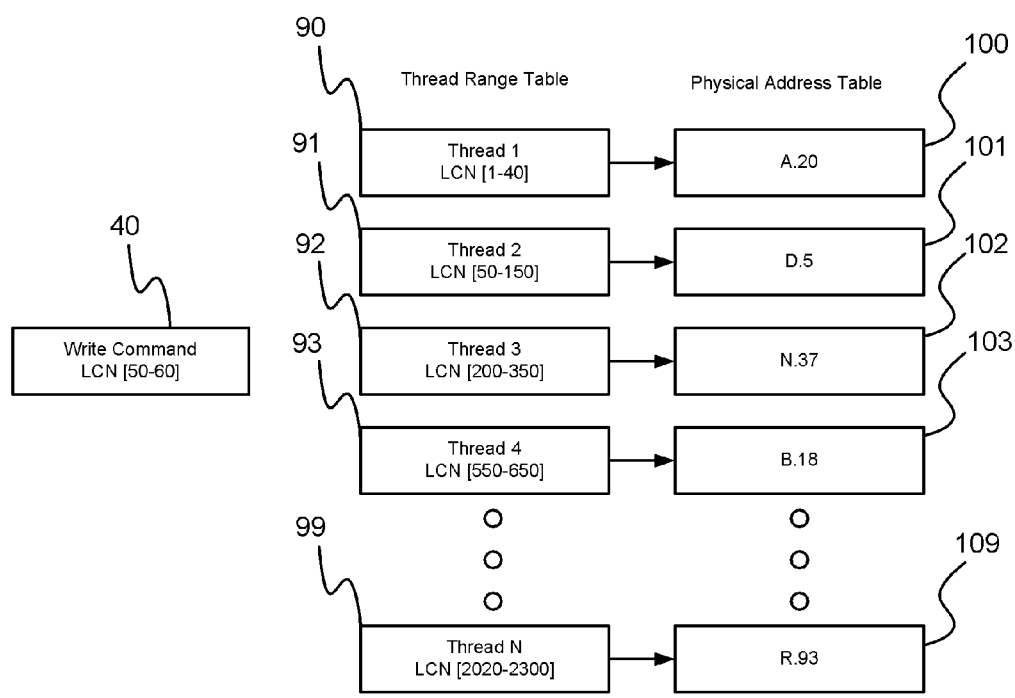
FIG. 2 is a block diagram showing an embodiment including a thread range table and a physical address table.

FIG. 2 shows an embodiment of the data maintained for the plurality of threads. The write command 40 includes a logical chunk number (LCN) address range, shown in FIG. 2 as 50-60. Although LCN is depicted in FIG. 2, any other suitable logical address representation can be used in other embodiments. The address range associated with the write command may be included with the write command, or the write command may include a beginning logical address and a length, from which the ending logical address may be calculated. FIG. 2 shows a thread range table, which may be part of the thread data 50 and includes example write threads 90, 91, 92, 93, etc. As shown, each write thread has a range with a beginning and ending logical address. For example, write thread 90 has a logical address range from LCN 1 to 40. Each thread may also be associated with a physical address, 100, 101, 102, 103, etc. In this figure, the write command's LCN range of 50-60 falls within the range for write thread 91, with a range of 50-150. As such, write thread 91 would be identified as the write thread for write command 40. Write command 40 would then be assigned the physical write address associated with write thread 91. In the example shown, this associated physical write address is physical write address 101, with the physical write address of D.5. After a match is determined, the physical write address and/or the logical address range of the matching thread may be updated to reflect the processing of the write command.

Concurrent Comparisons for Thread Identification

Figure 3:
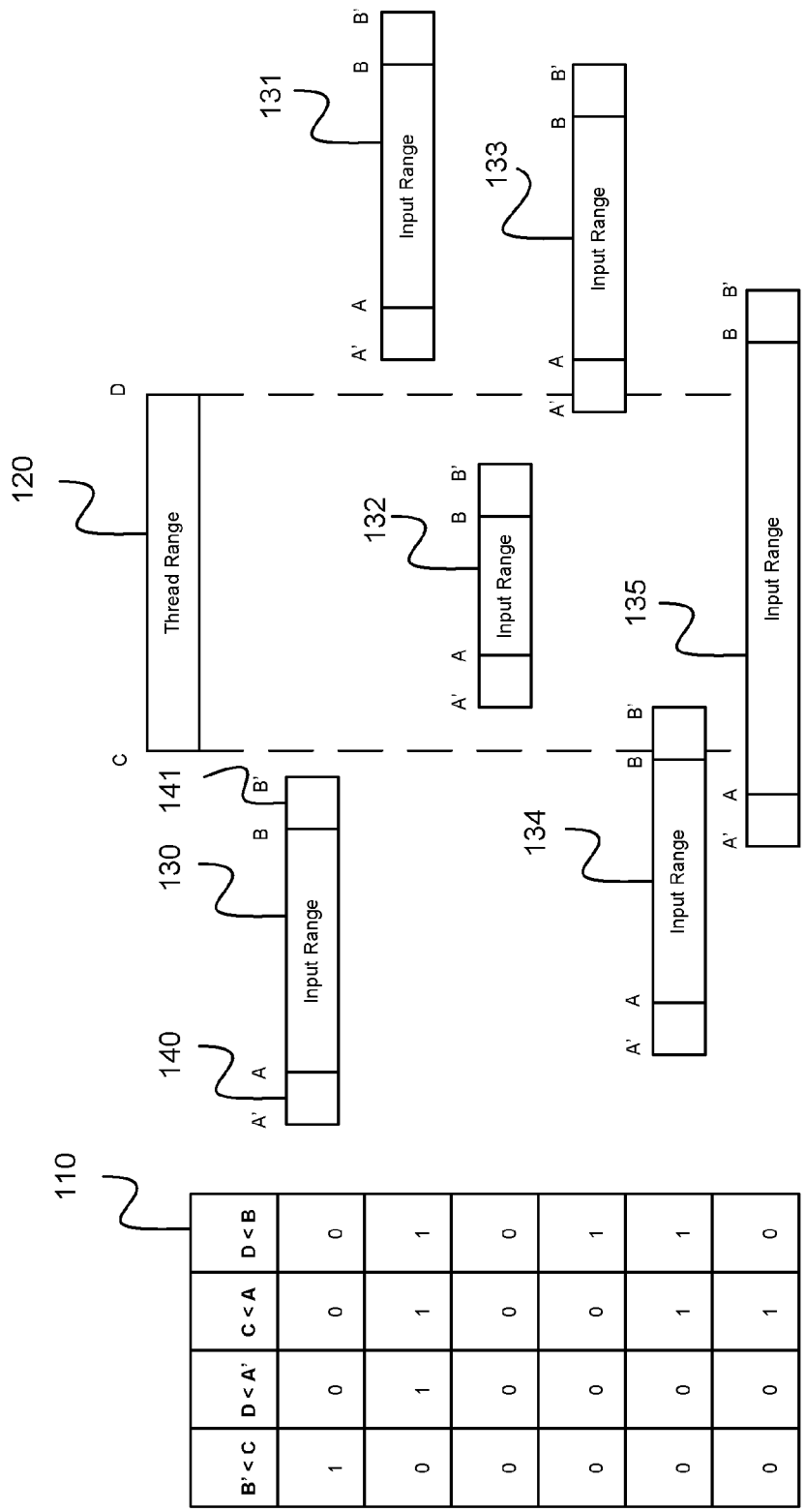
FIG. 3 is a block diagram showing a method for matching a write request with a thread range using a group of comparisons.

Referring now to FIG. 3, a method for identifying a thread according to one embodiment is shown. In this example, a thread range 120 (an address range associated with a thread) is compared to an input range 130 (an address range associated with an incoming write command). As shown, in one embodiment, the input range 130 is extended by padding values 140 and 141. The widths of the ranges in FIG. 3 depict the starting and ending logical addresses for each range. The dotted lines descending from C and D in this figure provide a visual aid to determine whether an input range is within the thread range. Comparison table 110 depicts the results of a series of comparisons which can be performed to determine whether the input range, as modified by the padding values, corresponds to the thread range. In addition, the series of comparisons can indicate whether the input range is entirely outside the thread range 120, contained within the thread range, or whether there is a high or low overlap. By performing the comparisons shown in comparison table 110, the results of the comparisons can indicate whether there is an overlap with the thread range 120, and whether the overlap is at the high or low range of the thread range 120. In one embodiment, the four comparisons of comparison table 110 can be performed in parallel to provide these results quickly and simultaneously.

The rows of the comparison table show the possible scenarios recognized by an embodiment of the invention. In one embodiment, the results of the four comparisons (represented by a series of 0/1 value, for example) can be encoded so that one of the six scenarios can be quickly determined. The scenarios include: outside thread range—low, outside thread range—high, input range wholly encompassed within thread range, high overlap, low overlap, and thread range wholly encompassed within input range. The first row of comparison table 110 corresponds to an example input range 130 (outside thread range—low), the second row of comparison table 110 corresponds to another example input range 131 associated with a different write command (outside thread range—high), and so on. In one embodiment, other series of 0/1 values outside of the six listed above would be considered an error and will be processed accordingly.

The comparison results for input range 130 shows an input range which is below the address range for the thread range 120, while input range 131 is shown to be above the thread range 120. Therefore, neither write command associated with input range 130 or 131 would be a match for the thread associated with thread range 120. On the other hand, input ranges 132, 133, 134, and 135 all overlap with the thread range 120 in some fashion. Input range 133 overlaps the high side of the thread range, input range 134 overlaps the low side, and input range 135 extends both above and below the thread range. Write commands associated with input ranges 132, 133, 134, and 135 would be considered a match with the thread associated with the thread range 120.

As shown by input ranges 133 and 134, the padding values 140 and 141 cause a comparison result to indicate an input range corresponds to a thread range even if the input range is merely proximate to the thread range. By the use of padding values in some embodiments, write threads can be identified even if a host provides write commands which are not exactly sequential, but are proximal to one another. Certain embodiments may omit padding values, while other embodiments may use uneven padding values for high or low extension (i.e., different values for padding values 140 and 141), or may use different padding values depending on which thread is being analyzed. For example, in the multiple host embodiment shown in FIG. 1B, a write command from each host may receive a different padding value. In another embodiment, a write command from each application executed on a common host system may receive a different padding value. In further embodiments, the padding values may be varied during operation of the storage device, or set according to a parameter of the host device. As an alternative to extending the input ranges, an implementation may use padding values to expand the range for a thread.

Embodiments of the invention may execute the comparisons shown in comparison table 110 in hardware. In these embodiments, several incoming write commands can be analyzed concurrently to identify their matching write threads and, if so, whether the input range extends above and/or below the thread range.

Thread Detection Loop

Figure 4:
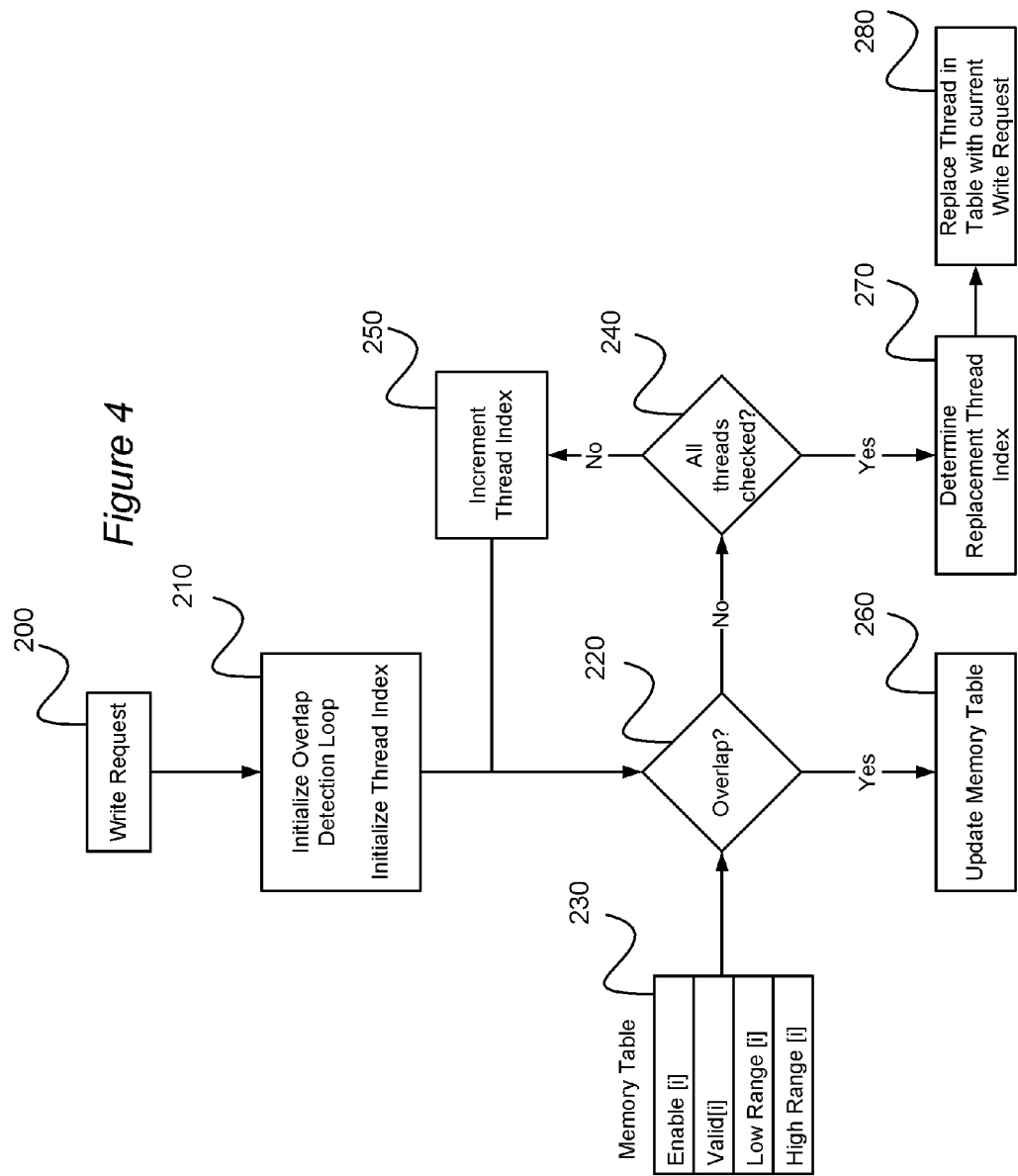
FIGS. 4 and 5 are flowcharts embodying methods for detecting and managing write threads.

FIG. 4 is a flowchart illustrating a thread detection process of an embodiment. In one embodiment, the process is performed by the controller of the solid-state storage system. At block 200, the controller receives a write request from a host device. At block 210, the process initiates an overlap detection loop by initializing variables for the detection loop and initializes a thread index. At block 220, it is determined whether there is an overlap between the input range of the write request and the thread range associated with the thread referenced by the current thread index. In determining whether there is an overlap, the process in overlap testing block 220 may use the thread table 230, which can include data reflective of low range values, high range values, whether a thread is enabled, and whether a thread is valid. The data may be stored in arrays in one embodiment, with each index in an array referencing a value for a corresponding thread. The valid and enable values may be set, for example, upon system startup or initialization of a thread detection system. In one embodiment, if a thread is not enabled or not valid, the thread will not be checked for an overlap, and the process proceeds to block 240. In one embodiment, the determination process in block 220 can follow substantially that which is outlined in FIG. 3. If it is determined that there is no overlap, the process proceeds in block 240 to determine whether all threads have been checked. If not all of the threads have been checked, then the process in block 250 increments the thread index, and moves to block 220 wherein it determines whether there is an overlap between the input range of the write request and the thread range of the next thread corresponding to the incremented thread index. On the other hand, if it is determined in block 220 that there is an overlap with the thread at the designated thread index, the process determines the index of the overlapped thread as well as the nature of the overlap (high, low, etc.) and moves to block 260.

At block 260, the memory table 230 may be updated depending on the nature of the overlap. For example, if the write request extends beyond the range of the write thread, the write thread's high range can be updated to reflect the upper range for the write command. Likewise, a write request which extends below an identified thread can update that thread's low range to the low range of the write request. If the thread extends above and below the identified write thread, both high and low ranges may be updated.

If each of the threads has been checked and no match is found, the process in block 270 in one embodiment determines a thread in the memory table that is to be replaced by determining the index of the replacement thread (the thread to be replaced). In one embodiment, the memory table 230 stores data on a limited number of threads (e.g., one thread per open superblock), and thus if no match is found a thread may need to be replaced. If a write request has been received and does not correspond to any write threads in the memory table 230, this can indicate that the storage device is receiving a write request for a new area of memory, and that the threads in the current memory table may be stale. To determine the replacement thread, each of these thread replacement policies may be used alone or in combination: the least frequently used thread, the least recently used thread, and a round robin selection. In certain embodiments, a replacement thread is chosen simultaneously while the thread identification loop determines whether there is a match. In other embodiments, the replacement thread may be determined in parallel with the determination of a write request overlap. Once a replacement thread has been identified, at block 280 the thread chosen for replacement is replaced in the thread table. By updating and replacing threads in the memory table according to the threads received, the thread table maintains a current view of the write threads being executed in the storage device.

In other embodiments, the determining of a replacement thread index in block 270 can be accomplished at alternate times. For example, the replacement thread index can be calculated simultaneously with the overlap calculations (block 220). Alternatively, the replacement thread index can be calculated prior to beginning the overlap detection loop (blocks 220-240-250).

Figure 5:
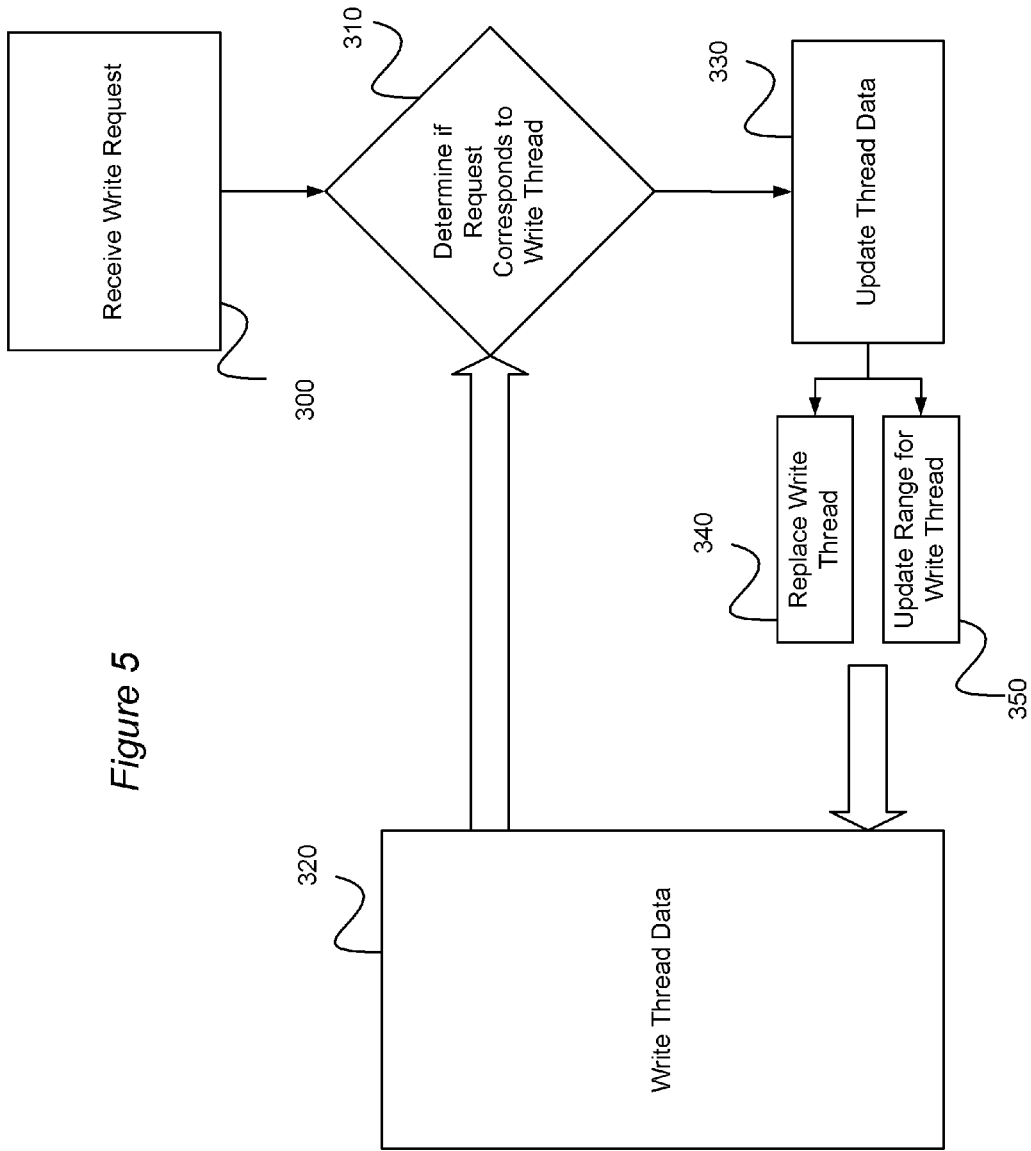

Those skilled in the art would appreciate that the method depicted in FIG. 4 do not require all the implementation details depicted and alternative implementations and substitutions may be used in accordance with the general method of detecting sequential write threads and processing incoming write requests shown in FIG. 5. In block 300, the storage device receives a write request. In block 310, the storage device determines whether the request corresponds to a write thread. In one embodiment, to complete block 310, the storage device reads from write thread data 320 maintained by the storage device and performs certain comparison operations on address data of the write request and address data in the write thread data as discussed above. However, in certain embodiments, the determination in block 310 may be made by reading thread identification data embedded in the write data of the write request. After determining if a request corresponds to a write thread, the thread data can be updated at block 330. Updating the thread data can comprise replacing one of the write threads via block 340, or updating the range for an existing write thread as in block 350. In blocks 340 or 350, the write thread data 320 can be changed to reflect the appropriate update. In certain circumstances, the updating block 350 may not change the write thread data 320. These circumstances may occur, for example, where there is thread which corresponds to the write command, but the write command does not extend above or below the write thread range. This circumstance is depicted in FIG. 3 by the input range 132.

CONCLUSION

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A solid-state storage subsystem for detecting sequential write threads, comprising:
   a solid-state memory array including a plurality of memory units; and
   a controller configured to receive a write command for the solid-state memory array, the write command including a logical address;
   wherein the controller is configured to:
      maintain data related to a plurality of write threads, each write thread of the plurality of the write threads being associated with a data stream from a host system, the data for each respective write thread comprising a physical write address and a logical address range associated with the write thread,
      determine whether the write command corresponds to a write thread of the plurality of write threads, and
      in response to determining that the write command corresponds to a write thread in the plurality of write threads, assign the physical write address associated with the corresponding write thread to the write command.

2. The solid-state storage subsystem of claim 1, wherein the logical address range of each respective write thread includes a beginning logical address and an ending logical address and the controller further determines whether the logical address of the write command is within the logical address range for a write thread by comparing the logical address of the write command with the beginning and ending logical addresses of the write thread.

3. The solid-state storage subsystem of claim 2, wherein the logical address of the write command comprises a beginning logical address and an ending logical address, and the controller further determines whether the logical address of the write command is within the logical address range for a write thread by comparing the beginning logical address of the write command with the beginning logical address of the write thread and the ending logical address of the write command with the ending logical address of the write thread.

4. The solid-state storage subsystem of claim 2, wherein the controller is configured to determine that the write command corresponds to a write thread with reference to a padding value.

5. The solid-state storage subsystem of claim 4, wherein a different padding value is used for the beginning logical address of the logical address range and the ending logical address of the logical address range for a write thread.

6. The solid-state storage subsystem of claim 4, wherein the padding value varies depending on the write thread.

7. The solid-state storage subsystem of claim 1, wherein the portion of the controller which determines whether the write command corresponds to a write thread is implemented at least partially in hardware.

8. The solid-state storage subsystem of claim 1, wherein the controller is further configured to update the data related to the corresponding write thread based at least in part on the logical address associated with the write command.

9. The solid-state storage subsystem of claim 8, wherein the logical address range comprises a beginning logical address and an ending logical address and wherein updating the data related to the corresponding write thread includes modifying at least one of the beginning logical address and the ending logical address associated with the write thread.

10. The solid-state storage subsystem of claim 1, wherein the controller is further configured to replace a write thread in the plurality of write threads for which the data is maintained when the write command is determined to not correspond to any of the plurality of write threads.

11. The solid-state storage subsystem of claim 10, wherein the thread chosen for replacement is determined at least in part by one of these methods: round robin, least frequently used, and least recently used.

12. A method performed by a storage subsystem, the method comprising:
    maintaining, for a plurality of write threads processed by a controller of the storage subsystem, data reflective of respective address ranges associated with the write threads, each write thread corresponding to a data stream from a host system in data communication with the storage subsystem;
    receiving a write command from the host system, said write command specifying a logical address; and
    identifying, based on the logical address and the data reflective of the respective address ranges, a particular write thread to which the write command corresponds.

13. The method of claim 12, wherein the identifying step is performed by a hardware component.

14. The method of claim 12, wherein the identifying step includes using a padding value to extend the logical address associated with the write command or the respective address ranges of the write threads to determine a particular write thread to which the write command corresponds.

15. The method of claim 12, further including the step of:
    updating the data reflective of respective address ranges associated with the write threads in response to the identification, the updating including at least one of:
      replacing a write thread in the plurality of write threads, and
      determining whether to update the data reflective of the respective address range for the identified write thread to reflect an extended address range for the write thread.

16. The method of claim 15, wherein the replacing step comprises:
    selecting a write thread in the plurality of write threads for which data related to the write thread will no longer be maintained; and
    initiating maintenance of data related to a new write thread to replace the selected write thread, the data being based at least in part on the logical address of the write command.

17. The method of claim 15, wherein the selecting step determines which write thread to replace based at least in part on a round robin, least recently used, or least frequently used policy.

18. The method of claim 15, wherein the identifying step and the determining whether to update step are performed concurrently in hardware in a series of comparison operations using the logical address and the data reflective of respective address ranges associated with the write threads.

* * * * *